United States Patent
Höhe et al.

(10) Patent No.: US 7,000,924 B2
(45) Date of Patent: Feb. 21, 2006

(54) FLAT GASKET AND METHOD FOR THE PRODUCTION THEREOF

(75) Inventors: Kurt Höhe, Langenau (DE); Armin Gütermann, Leipheim (DE); Günther Unseld, Neenstetten (DE); Georg Egloff, Weissenhorn (DE)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/311,553

(22) PCT Filed: Jun. 15, 2001

(86) PCT No.: PCT/EP01/06807

§ 371 (c)(1),
(2), (4) Date: May 22, 2003

(87) PCT Pub. No.: WO01/96768

PCT Pub. Date: Dec. 20, 2001

(65) Prior Publication Data

US 2004/0041352 A1    Mar. 4, 2004

(30) Foreign Application Priority Data

Jun. 15, 2000   (DE)   ................................. 100 29 403
Dec.  7, 2000   (DE)   ................................. 100 60 872

(51) Int. Cl.
*F02F 11/00* (2006.01)
(52) U.S. Cl. ..................... 277/593; 277/594; 277/595
(58) Field of Classification Search ................ 277/592, 277/593, 595
See application file for complete search history.

(56) References Cited

U.S. PATENT DOCUMENTS

| | | | | |
|---|---|---|---|---|
| 843,394 A | * | 2/1907 | Haynes | ........................ 277/595 |
| 1,030,055 A | * | 6/1912 | Darlington, Jr. | ............. 277/612 |
| 3,843,141 A | * | 10/1974 | Kuhn | ......................... 277/595 |
| 4,203,608 A | * | 5/1980 | Nicholson | .................... 277/595 |
| 4,372,564 A | * | 2/1983 | Nicholson | .................... 277/595 |
| 4,387,904 A | | 6/1983 | Nicholson | |
| 4,803,965 A | | 2/1989 | Udagawa et al. | |
| 5,118,121 A | | 6/1992 | Hellman, Sr. | |
| 5,306,024 A | * | 4/1994 | Udagawa | ..................... 277/592 |
| 5,421,594 A | * | 6/1995 | Becerra | ....................... 277/608 |
| 5,522,604 A | | 6/1996 | Weiss et al. | |
| 5,690,343 A | | 11/1997 | Takada et al. | |
| 5,727,795 A | * | 3/1998 | Plunkett | ...................... 277/601 |
| 5,775,701 A | * | 7/1998 | Martini | ....................... 277/591 |
| 5,785,322 A | * | 7/1998 | Suggs et al. | ................. 277/615 |
| 5,988,651 A | * | 11/1999 | Miyaoh | ...................... 277/593 |
| 6,089,572 A | * | 7/2000 | Plunkett | ...................... 277/592 |
| 6,186,513 B1 | * | 2/2001 | Udagawa | ..................... 277/593 |

(Continued)

FOREIGN PATENT DOCUMENTS

DE         862536         1/1953

(Continued)

OTHER PUBLICATIONS

International Search Report, 2 pages.

(Continued)

*Primary Examiner*—Alison K. Pickard
(74) *Attorney, Agent, or Firm*—Rader, Fishman & Grauer PLLC

(57) ABSTRACT

The invention relates to a flat gasket comprising at least one metallic layer, in which at least one continuous opening is made, whereby the or at least one metallic layer (1) is provided, at least in areas, in the shape of an undulated and/or serrated profiling (2) around the continuous opening (s).

30 Claims, 9 Drawing Sheets

U.S. PATENT DOCUMENTS

Figure 1:
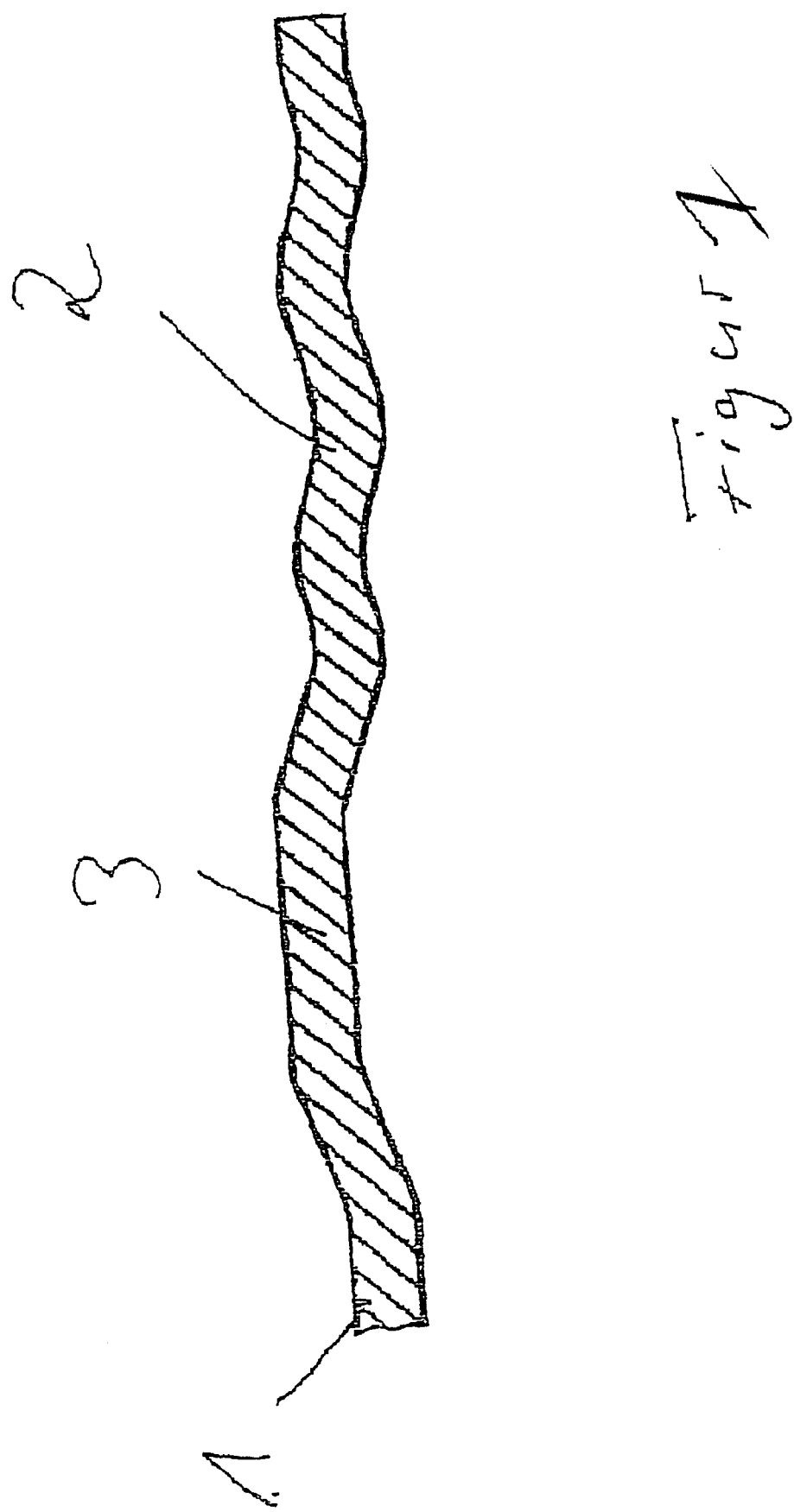

| | | | | |
|---|---|---|---|---|
| 6,209,884 | B1 * | 4/2001 | Taudt | 277/607 |
| 6,315,303 | B1 | 11/2001 | Erb et al. | |
| 6,343,795 | B1 * | 2/2002 | Zerfass et al. | 277/593 |
| 6,705,618 | B1 * | 3/2004 | Jinno et al. | 277/593 |
| 2004/0183260 | A1 * | 9/2004 | Kestly | 277/593 |
| 2005/0173868 | A1 * | 8/2005 | Hatamura et al. | 277/593 |

FOREIGN PATENT DOCUMENTS

| | | |
|---|---|---|
| DE | 2145482 A1 | 6/1973 |
| DE | G9410681.9 A1 | 7/1994 |
| DE | 19641491 A1 | 4/1998 |
| DE | 29804534 U1 | 7/1998 |
| DE | 19829058 A1 | 1/2000 |
| DE | 19902394 A1 | 8/2000 |
| DE | 19928601 A1 | 12/2000 |
| EP | 0470790 A1 | 2/1992 |
| EP | 0866245 A2 | 9/1998 |
| EP | 0893630 A2 | 1/1999 |
| EP | 0937924 A2 | 8/1999 |
| EP | 0 942 205 A1 | 9/1999 |
| EP | 0940608 A1 | 9/1999 |
| EP | 1111277 A2 | 6/2001 |
| EP | 0695897 B1 | 7/2001 |
| GB | 2064677 | 6/1981 |
| JP | 2519612 | 9/1996 |
| WO | WO95/22020 | 8/1995 |

OTHER PUBLICATIONS

German article entitled *"Vom Simmerring zur aktiven Dichtungstechnik"*.

Derwent English Abstracts for DE19928601A1, DE19829058A1, DE2145482A1, DE19641491A1, DE19902394A1, and EP0893630A2.

Delphion English Abstract for DE29804534U1.

Delphion English Abstract for EP 0 942 205 A1 (2 pages).

Translation of Abstract of DE-G9410681.9-A1.

* cited by examiner

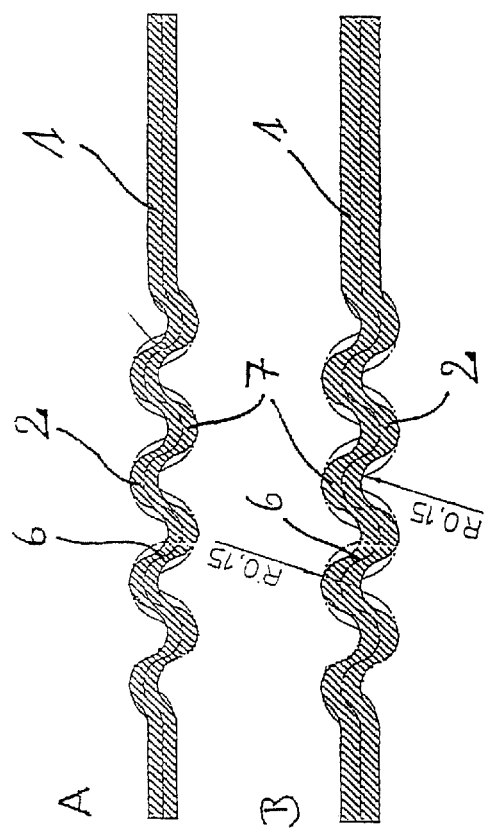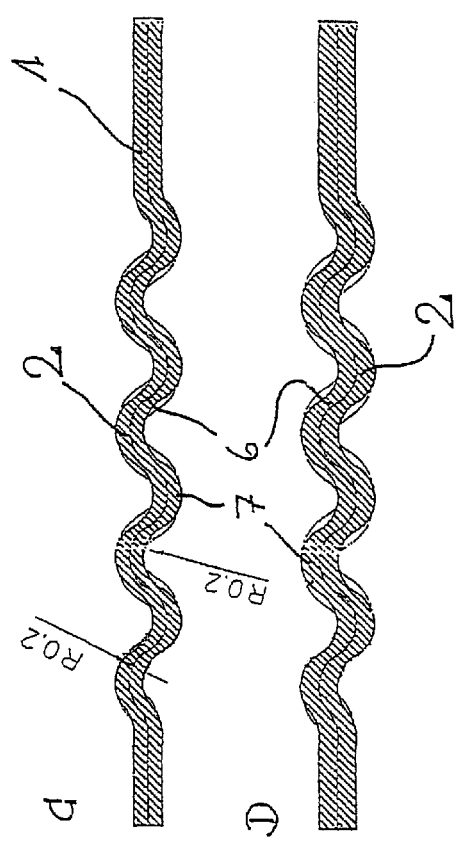
Fig. 5

A
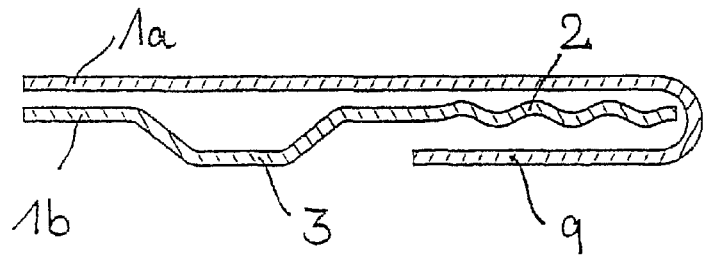
B
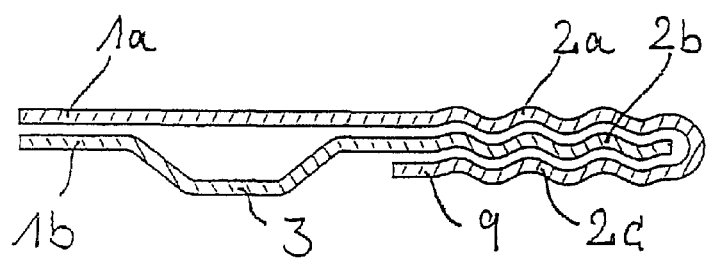
C
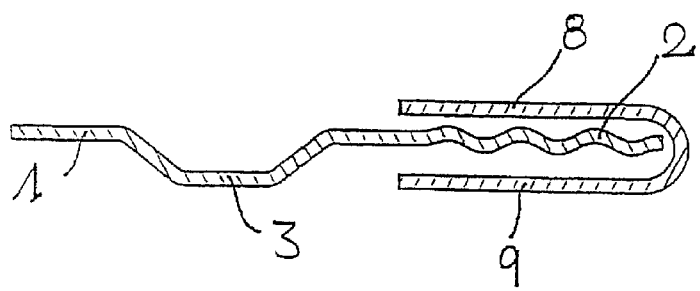
D
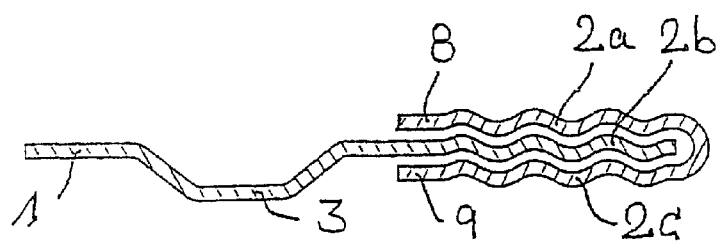
Fig. 7

FLAT GASKET AND METHOD FOR THE PRODUCTION THEREOF

The invention relates to a flat gasket having at least one metallic layer in which respectively at least one port is formed and a method for the production thereof. The single or also multi-layer flat gasket can be formed and used in particular as cylinder head gasket but also for other faces to be sealed together, such as the most varied flange gaskets.

In order to increase and safeguard the sealing effect of such a metallic flat gasket over a fairly long period of time, it is normal to form a bead, which completely encloses this port as a rule, around the most varied ports by corresponding shaping at least of one of the layers of such a flat gasket.

Such a bead can however only fulfil the function as long as a certain degree of elasticity is maintained in the bead region, which as a rule cannot be maintained without additional aids with which a complete plastic deformation is prevented. For this purpose normally deformation limiters are used for the beads. Such deformation limiters are known in the most varied of embodiments and are normally designated also as "stoppers". Thus, deformation limiters can be obtained by bending over one of the metallic layers or by additional elements.

In DE 298 04 534, an example of such a deformation limiter in the form of a grooved region which is formed in a metallic layer is described. Such a grooving is produced in the metallic layer by cold or hot shaping. The grooving is thereby dimensioned with respect to the thickness of the metallic layer or respectively also taking into account specific installation conditions of such a gasket in such a manner that the grooved region represents a corresponding thickness increase.

However, only a limited influence can be achieved on the desired properties with such a grooving as deformation limiter and in particular the variation with corresponding adaptation to the most varied of usage conditions, which can also be locally different on a flat gasket, is only possible in a conditional manner and in a restricted form.

In each of the suitable production methods, a change in the metal in this region occurs, independently of whether a cold or respectively a hot forming has been implemented which must be taken into account for such flat gaskets at least in the choice and shaping of the flat material.

In particular in the formation of such a grooving by pressing into the cold metal, a corresponding wear and tear on the pressing tool occurs so that the costly tools must be replaced at more or less large intervals.

In addition, the grooves cannot be introduced into the metallic layer reproducibly at any depth and at any density.

It is hence the object of the invention to make available a flat gasket and also a method for the production thereof having at least one metallic layer which is better adapted to the locally occurring influences and with which such a flat gasket can be produced economically.

According to the invention, this object is achieved by a flat gasket according to claim 1 or a method according to claim 29. Advantageous embodiments and developments of the invention are produced with the features contained in the subordinate claims.

In the case of the flat gasket according to the invention which can comprise one or respectively also a plurality of metallic layers disposed one above the other, there is inserted, in contrast to the already mentioned, known grooving, a profiling in at least the one metallic layer or in one of the metallic layers at least in regions around the one or also more ports, in particular in ports for combustion chambers in cylinder head gaskets. Such a profiling can be formed thereby in an undulating form and/or in a serrated form, this form being impressed into the respective metallic layer.

The term undulating in the present invention includes also embodiments which deviate from a sinusoidal wave. The undulation can accordingly be flattened also into crests and troughs and have for example straight sides. Trapezoidal embodiments also fall within the term wave of the present invention.

The profiling is formed preferably at least in regions around the port(s), as far as possible adapted to its external contour. Ideally, such a profiling has three and more wave crests or three and more teeth on each side of the gasket. In this case, a good sealing behaviour is achieved even without filling or coating of the profiling.

If a serrated profiling is impressed, it is expedient to correspondingly round off the tips of the individual teeth which point alternately in the direction of both sealing faces. In the case of a wave profile, this is of course not required. In both cases, the respective wave crests or wave troughs can however also be flattened out or smoothed, as a result of which a particularly effective seating surface of the stopper on the adjacent sealing layers is formed. Advantageously, the heights of the wave crests or of the individual teeth, i.e. the amplitude, are not definitely constant across the entire profiling but, in specific circumferential regions around a port, taking into account the respective geometric shape, can be of a different size. In the same way, the spacings of wave crests or teeth relative to each other can also be varied.

Different amplitudes of the teeth or wave crests and/or different spacings between the individual teeth or wave crests and also different radii of the waves, proceeding at an increasing spacing from the edge of the respective port, can be set in order to be able to locally influence in particular the elasticity and the resilient rigidity in a targeted manner. A plastic forming of one region of such a profiling can also be permitted thereby in a defined manner or be undertaken already before installation of such a flat gasket.

Furthermore the transition region between wave troughs and wave crests or between teeth situated adjacent to each other on oppositely situated sides can have a lower material thickness than the wave crests/wave troughs or teeth. By suitable impressing during production of the profiling (edge swaging) the material thickness can also be profiled in this manner and the properties of the profiling can be adapted to the respective specific conditions. It is also possible to swage not the edges but rather the crests or troughs. A so-called radius swaging then leads to a thickening of the edges.

It can already suffice to form a profiling around the ports, the period length of which is =1. This means that the profiling comprises merely two wave crests or two teeth which are formed in respectively opposed directions. Of course, a larger number of wave crests, advantageously three or more, can however also be used.

It is particularly preferred if the profiling is used as deformation limiter for additionally formed beads.

The possibility therefore exists with a single layer gasket of forming a profiling according to the invention at least on one side of one such bead, of course the possibility also being offered of an arrangement of profilings on both sides. Preferably the profiling is disposed on the combustion chamber side. In the case where the profiling functions as deformation limiter and is adjacent to a bead, the formation of the undulation, i.e. the profile height (amplitude) and the spacing of the wave crests (period) is coordinated to the bead. The profiling, i.e. in particular the amplitude of the wave, must be smaller than the extension of the bead (see for example FIGS. 4 and 6).

The profiling can however be formed even in the case of a multi-layer seal in one layer and the bead in an adjacent layer.

According to the invention, a flat gasket can comprise also at least two metal layers which both have an undulating or serrated profiling. These profilings can be placed one above the other. Advantageously, the profilings in the two layers are designed differently with respect to length, depth and/or radius of the respective undulation (amplitude, profile height and radius). If two differently designed undulating beads are compressed such in the engine, directly in contact with each other, then the relative movement of each of the undulating beads is dependent upon the respective wave structure. The difference of the relative movement of the two profilings can be used as elastic spring element for sealing with a high tensioning force. Thus in one of the metal sheets there is no need for the entire bead and nevertheless the tensioning force of an entire bead can be exceeded.

Furthermore, the layer, which has the profiling, can be reinforced in the region of the profiling by at least one further layer, for example a ring, advantageously with the width of the profiling. This layer or this ring can grip round the profiled layer also along the circumferential edge of the port at least in regions and form there a so-called folded stopper. The reinforcing layer or respectively the reinforcing ring can have the same profiling and consequently both profilings can abut against each other in a form fitting manner. Here also, the amplitude, period and radius of the profiling of the reinforcing layer or respectively of the reinforcing ring can however be varied along the circumferential edge and/or perpendicularly to the circumferential edge of the port. If the period, amplitude and radius differ from each other on various layers of adjacently disposed profiling, then the sealing behaviour can be specifically influenced further in this manner.

The stopper (layer or ring) can be connected to the undulating stopper by means of any optional welding methods. By means of this welded-on stopper, a variable projection is achieved which at the same time contains an elastic portion. The choice of thickness of the additional stopper makes it possible to adapt the gasket in the stopper region to the engine conditions. Thus, very high and robust constructions can be achieved, for example for diesel engines even in the sphere of lorries.

In contrast to conventional flat gaskets with deformation limiters, bending-over or beading of layers of the flat gasket or additional elements in order to produce deformation limiters can be dispensed with and consequently the production costs can be reduced.

In a preferred embodiment, an adequate and durable sealing effect of a flat gasket according to the invention with corresponding profiling can also be achieved if the beads surrounding the ports have been dispensed with. In this case, the entire function, which has been achieved previously by the bead with deformation limiter, is achieved solely by means of the profiling.

For this purpose, the profiling of one or more layers can be virtually optimised by corresponding shaping and dimensioning in that the elasticity, the resilient rigidity and also a specifically desired degree of plastic deformation can be set in the various regions of such a profiling. Hence, it is possible as mentioned already initially, correspondingly to vary the spacings of the individual wave crests or teeth from each other and/or their heights and/or the radii of the individual waves. For example the region of a profiling pointing in the direction of a port can also have smaller spacings of the wave crests or teeth from each other than the further removed regions. In the just mentioned region, the elasticity is consequently less than in the densely packed regions of such a profiling. The spacings and/or heights can however also be successively enlarged, starting from the external edge of a port.

The densely packed regions of a profiling have a smaller elasticity and, in contrast thereto, are plastically deformable in a limited manner and this region can accordingly take over if necessary the function of a deformation limiter.

Furthermore, a variation in the number of wave crests or troughs or teeth, in the sheet thickness, in the heights or form, in particular of the radii of the wave crests/wave troughs or teeth and their spacing and the like can also be produced along the circumference of the port, for example of a cylinder boring.

The metal layers, in which the profiling is introduced, can also be formed differently with respect to their upper side and underside, i.e. to both sides, which are orientated in the installed state for example towards the cylinder head or cylinder block, for example with respect to height and form of the wave crests, wave troughs and the like so that the stopper can accomodate the different properties of for example cylinder head and cylinder block which can be manufactured from different materials.

The layer which has the profiling can furthermore be formed from cold deformable steel, for example a maraging steel, such as Zapp VACL 180T which hardens by tempering for example to 300° C.

The rigidity of specific regions of a profiling can also be increased by means of webs which are disposed and formed between the individual adjacent wave crests or teeth. Such webs can be used in a serial or else offset arrangement. The webs can however also be present only in one region which is disposed at a greater spacing from the respective port.

The profiling to be inserted according to the invention can be formed in the most varied of metallic materials, i.e. also in various spring steel materials, an even greater elasticity and consequently an improvement in the sealing effect being able to be achieved with spring steel over a long period of time.

The flat gasket according to the invention can be developed in addition in that materials known per se are applied on at least one side of a metallic layer. Suitable materials, for example elastomers, are mentioned for example in DE 198 29 058, DE 199 28 580 and DE 199 28 601, the disclosure content of which is referred to in its entirety.

Such a filler is then present at least also in regions and in parts of the profiling and the elasticity and resilient rigidity can be influenced by means of the respective elastomer. A further influential dimension, when using such fillers, is in addition to their arrangement also the respective filling level in the profiling. This means that the wave troughs of such a profiling or the intermediate spaces between the teeth of a serrated profiling can be filled completely but also partially so that, in addition to the already mentioned local influence on elasticity and resilient rigidity, the damping properties can be influenced also in various ways.

The filling level can be changed with an increasing spacing from the edge of the ports. It can however also be varied across the circumference of the respective ports.

The flat gaskets according to the invention, irrespectively of whether they are intended to be produced in a single layer or multi-layer with or without additional filler, can be produced with few technologically, easily controllable operational steps and consequently in a particularly economical manner.

Due to the most varied of options with respect to the shaping and dimensioning of the profiling, properties can be set specifically locally.

The possibility also exists of using a combination of undulating and serrated forms within one profiling.

Attention should be drawn not least to the fact that, in the case of a serrated profiling, the correspondingly formed layer is bent correspondingly in cross-section and the individual teeth are not impressed into the material, as is the case in the grooving known in the state of the art. This applies of course analogously to an undulating profiling also.

In the case of the flat gaskets according to the invention, no local hardening occurs in the metal. In addition, a reduced warping is achievable. The profilings can also be formed with hard spring steels.

Figure 2:
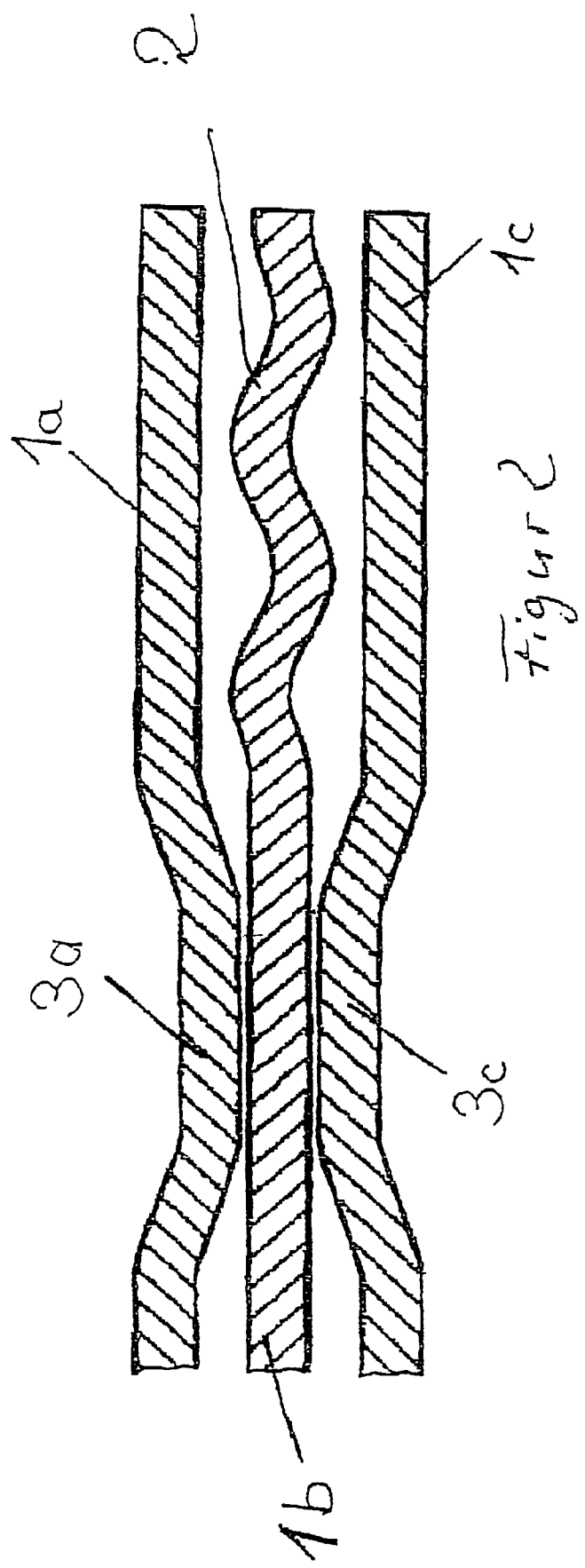
Figure 3:
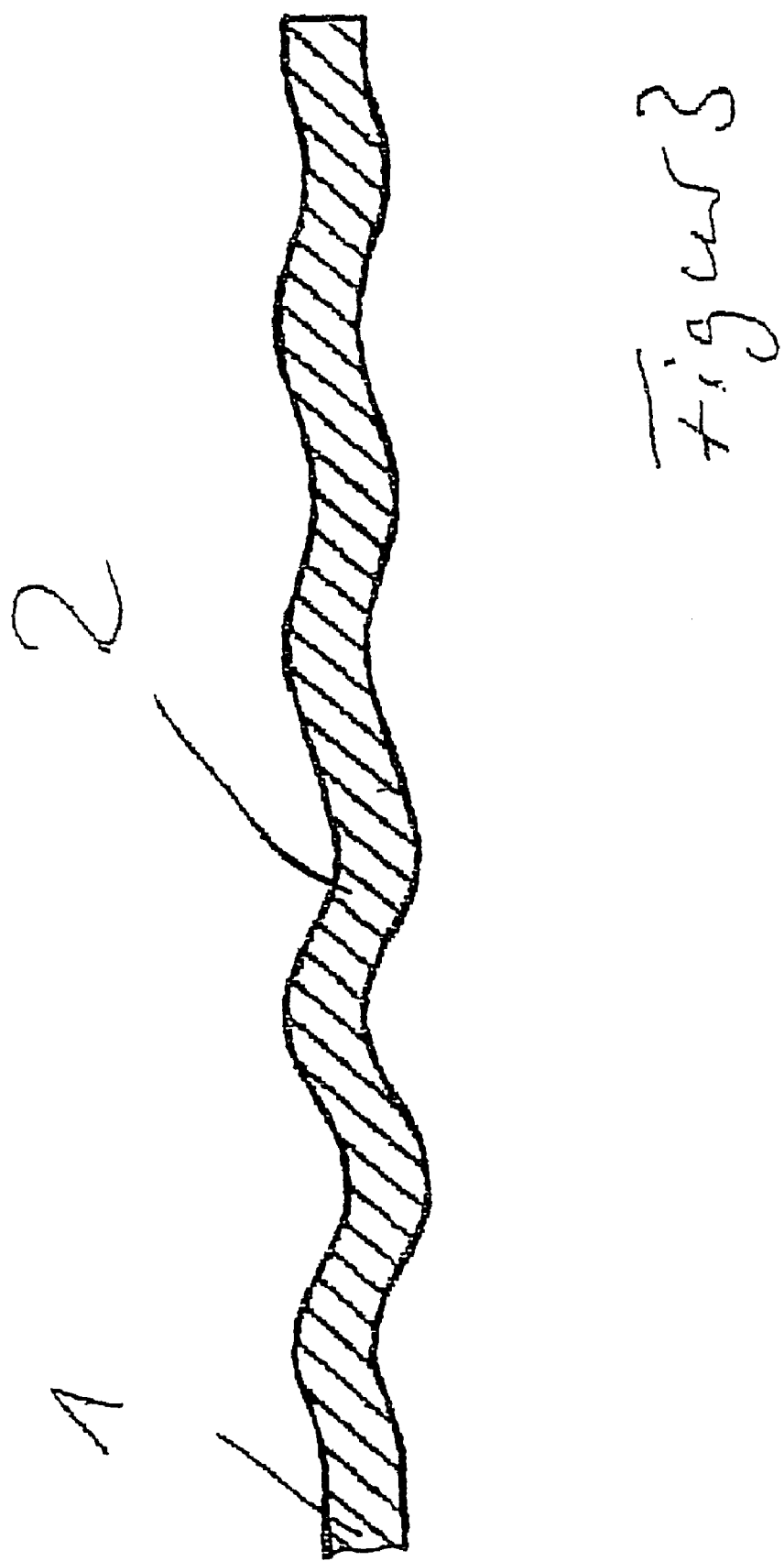
Figure 4:
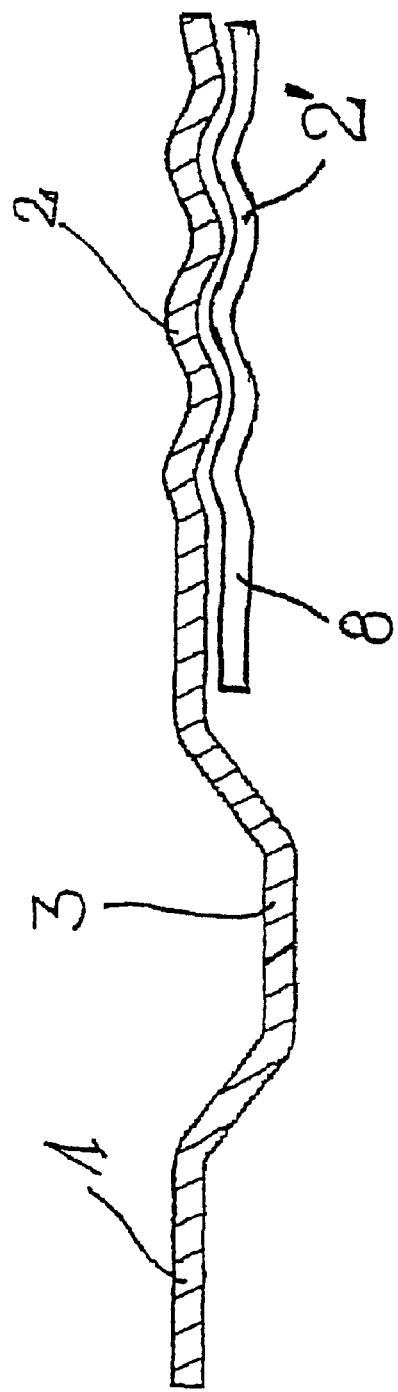
Figure 6:
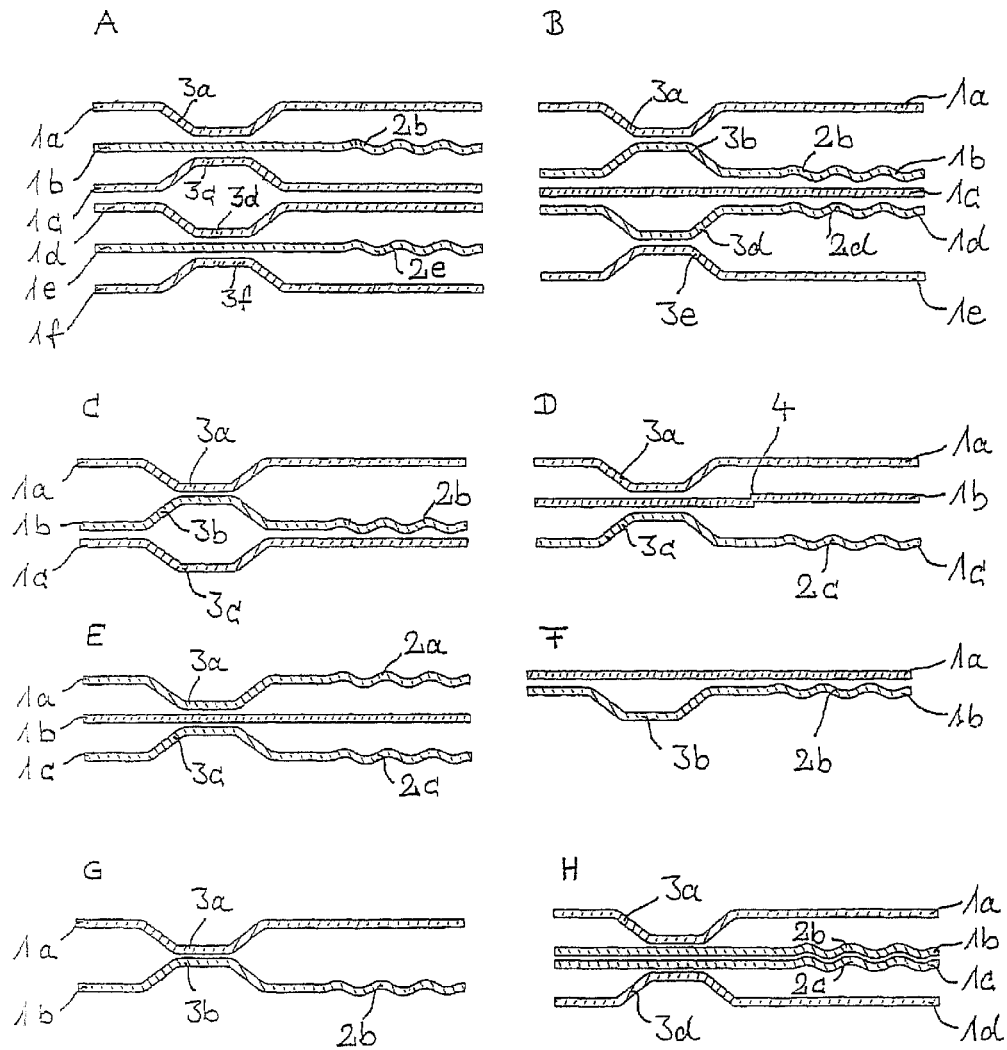
Figure 8:
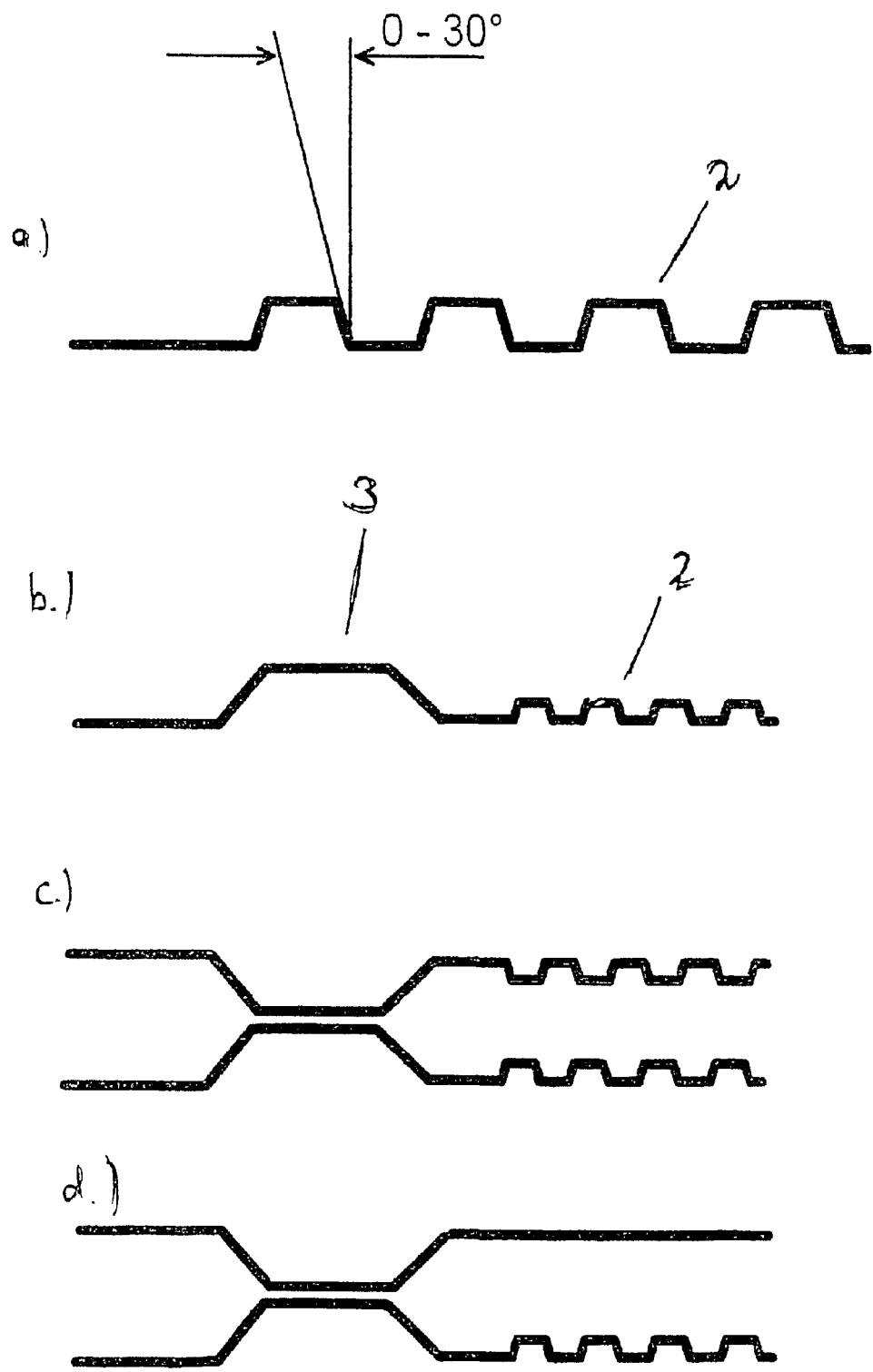

The invention is intended to be explained in detail subsequently with reference to embodiments which show;

FIG. 1 a sectional representation through a part of a flat gasket according to the invention in which an undulating profiling forms a deformation limiter for a conventional bead;

FIG. 2 a part of a three-layer flat gasket with two externally situated beaded layers and FIG. 3 a part of a further example of a flat gasket according to the invention with a variably formed profiling;

FIG. 4 a further example of a flat gasket according to the invention;

FIG. 5 four further examples of single layer flat gaskets according to the invention;

FIG. 6 in total eight further examples of flat gaskets according to the invention;

FIG. 7 four further examples of flat gaskets according to the invention;

FIG. 8 an embodiment in which the profiling is formed as a trapeze, and

Figure 9:
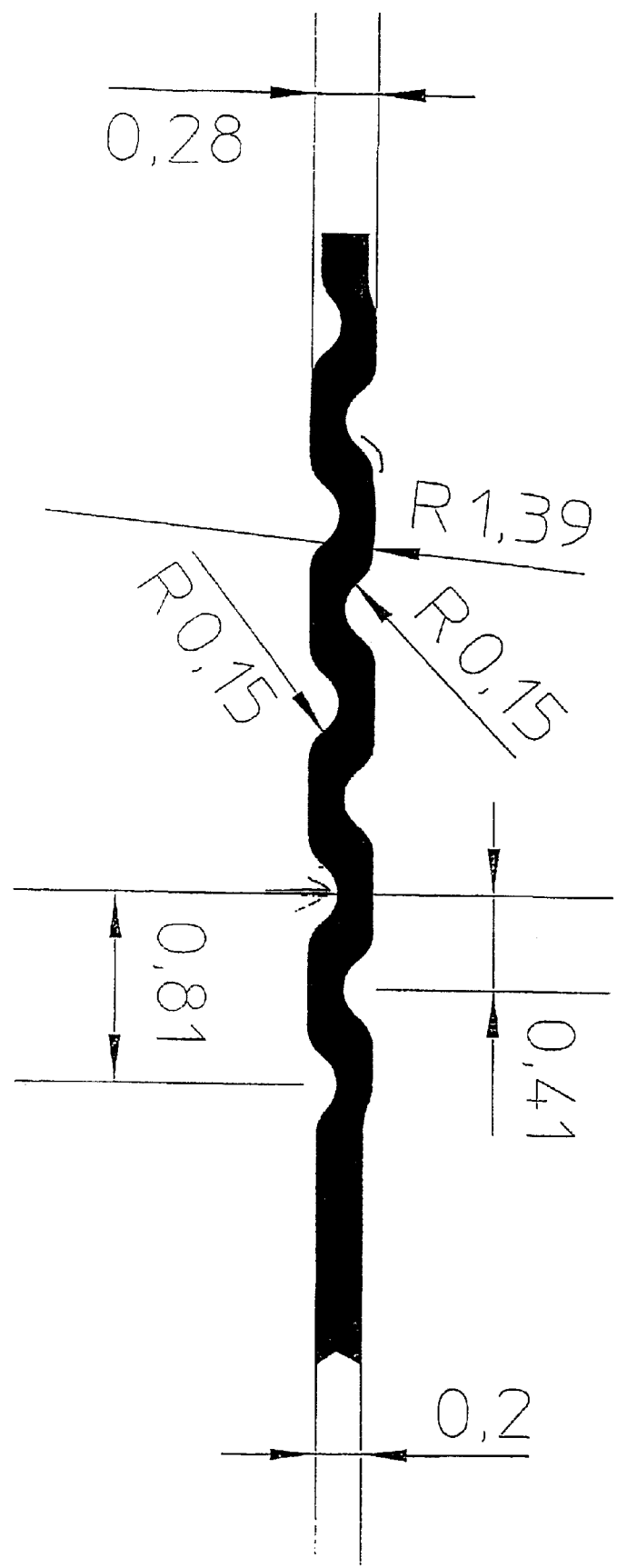

FIG. 9 an embodiment in which the profiling is formed as a radius-swaged bead.

In the example of a single layer flat gasket according to the invention, illustrated in FIG. 1, a bead 3 is formed in the metallic layer 1 and, in the direction of a port, not shown here, there abuts an undulating profiling 2, the wave crests and wave troughs of which are disposed regularly and consequently the wave crests also have a constant profile height and constant spacings from each other. The profiling 2 fulfils in this case, in addition to the function of a deformation limiter for the bead 3, also a sealing function in addition due to the achievable elastic properties.

Here as in the description of the following Figures, corresponding reference numbers are used for corresponding elements.

The resilient characteristics and consequently also the elasticity can, in a non-illustrated form, be influenced by filling the intermediate spaces between the adjacent wave crests of the profiling 2, for example with elastomer and at different filling levels. Of course, the intermediate spaces between the wave crests can also be filled completely with an elastomer.

In a non-illustrated form, a corresponding profiling 2 can be formed also on the other side of the bead 3.

A three-layer flat gasket is shown in FIG. 2. In this example, beads 3 are again formed in the two externally situated layers 1' of the flat gasket and a likewise undulating profiling 2 is present correspondingly in the central layer 1. Of course, the statements with respect to options for influencing properties, which have been made already in FIG. 1, also apply analogously to this example.

In FIG. 3, once again a single layer metal flat gasket is shown, the formation of an additional bead 3 having been dispensed with in this example. The bead function in this example can also be fulfilled by the correspondingly formed profiling 2. The spacings and profile heights of the individual wave crests of the profiling 2, starting from the direction of the edge of a port, not shown here, are thereby smaller than is the case in the regions of the profiling 2 at a greater spacing from the port. The correspondingly more closely situated regions are more rigid and can be deformed plastically only slightly, if at all.

The region, which is further away from the port, has a greater period length, the spacings of the wave crests from each other are correspondingly greater, the latter also applying to the profile height of the wave crests in this region. Consequently, a higher elasticity and lower rigidity is present in this region of the profiling 2. In the installed, i.e. pre-stressed state of such a flat gasket, the region of the profiling 2 with the greater spacing from the port can then fulfil a deformation limiter function for the pre-positioned region of the profiling 2 due to the mentioned properties.

The profiling can be obtained in its shape by using a correspondingly formed and dimensioned impressing tool already during forming. However the possibility exists of producing such a shaping of this region in a second technological operational step by corresponding swaging and pressing.

It is advantageous if the firstly obtained profiling 2 is planished subsequently completely or in regions so that in the planished region the profile height is reduced again. For this purpose, one or two stamps with flat pressing faces orientated parallel or diagonally at an angle towards the surface of the metal layer 1 can be pressed onto the region to be planished. During planishing, the metallic layer 1, in particular at the edges of the profiling 2 should be braced. Due to the subsequently implemented planishing, the rigidity and the hardness of the profiling 2 can be increased and consequently also the rigidity of a flat gasket according to the invention.

Since in the examples of flat gaskets according to the invention, illustrated in the FIGS. 1 to 3, representative limits are set by the choice of sectional representations, it should be indicated that the profiling, as seen across the circumference, i.e. in various radial axes, can be shaped and dimensioned differently. Thus the possibility exists of varying the number of successively disposed wave crests or teeth across the circumference and/or of undertaking a corresponding change in the spacings and profile heights of the profiling.

FIG. 4 shows a further example of a single layer flat gasket, having a single metal layer 1 in which a bead is impressed. An undulating stopper region 2 is disposed between the bead 3 and the port situated on the right. Said stopper region has in total three wave crests and three wave troughs. Underneath this stopper region, a ring 8 is welded-on along the circumferential edge of the port, said ring having the same profiling as the metal layer 1 and abutting against the latter in a form fit. In the ring 8, a profiling 2' with three wave crests and three wave troughs is formed likewise as a result. With an additional stopper ring 8 of this type, the flat gasket according to the invention can be adapted to variable engine geometries or engine conditions in which both the width and the material thickness of the metal ring 8 are chosen correspondingly.

FIG. 5 shows details of four further flat gaskets comprising respectively one single layer. This individual layer can equally be a component of a multi-layer gasket. The illustrated flat gaskets in FIG. 5A and 5C have the same material thickness, whilst the flat gaskets shown in FIGS. 5B and 5D have a greater layer thickness. In contrast, the undulations in the stopper region 2 in FIGS. 5A and 5B have a smaller radius of curvature than in the flat gaskets in FIGS. 5C and 5D. It is shown here consequently that, by means of a different material thickness of the layer and also by means of different forming of the profiled regions 2 of the layer 1, greater clearance for adaptation possibilities of this stopper 2 to various engine characteristics are offered.

Furthermore, in all the profiled regions 2 illustrated in FIG. 5, respectively the material thickness in an intermediate region 6 between a wave crest 7 and an adjacent wave trough 7 is smaller than in the region of the wave troughs or wave crests 7. As a result, the elastic behaviour of the stopper regions 2 can also be varied.

FIG. 6 shows in total eight different variants of flat gaskets according to the invention. FIG. 6A shows an in total six-layer flat gasket comprising six metal layers 1a to 1f. In the layer 1b and in the layer 1e, two profiled stopper regions 2b or 2e are formed respectively as deformation limiters for the beads 3a, 3c, 3d or 3f formed in the layers 1a, 1c, 1d and 1f.

A corresponding five-layer gasket is illustrated in FIG. 6B in which once again two layers are provided with profiled stopper regions. In this case, an intermediate layer 1c is interposed between the two upper layers 1a and 1b and the two lower layers 1d and 1e, said intermediate layer having neither a bead nor being profiled.

Three-layer flat gaskets are illustrated in FIGS. 6C to 6E, the intermediate layer 1b having a step 4 in FIG. 6D. A profiled stopper region 2c, which functions as stopper for the bead 3c, is adjacent to the step 4 on one side. As a result of the fact that an offset is provided in the layer 1b which offset is orientated away from the stopper region 2c, the elastic stopper function of the profiled region 2c across the layer 1b which is offset in the profiled region of the layer 1c is used also for the bead 3a in the layer 1a. FIGS. 6F and 6G show two-layer flat gaskets in which a profiled region 2b is formed in respectively one of the gasket layers. Said region serves as stopper (deformation limiter) for the beads 3b in FIG. 6F or the beads 3a and 3b in FIG. 6G.

FIG. 6H shows in turn a four-layer flat gasket, respectively one bead 3a and 3d facing towards each other being formed in both external layers 1a and 1d. These two external layers 1a and 1d enclose two further layers 1b and 1c which have no bead. They have however regions 2b and 2c which are chosen laterally adjacent to the beads 3a and 3d, said regions having the same profiling and abutting against each other in a form fit. These two layers 1b and 1c form a stopper (deformation limiter) in the profiled region for the beads 3a and 3d by means of the parallel extending profiled regions 2b and 2c. Due to this arrangement of two parallel profiled regions, the sealing effect and the deformation limiting can be adapted to the respective conditions of the engine to be sealed.

If alternatively, in the gasket according to FIG. 6H for the two layers 1b and 1c in the region of the undulating profilings 2b and 2c, different lengths, depths and/or a different radius of the undulations is used in the two profilings, then the extended length of the two profilings is different when compressed in the engine for the two layers 1b and 1c. This difference of the relative movement leads to narrow annular contacts between these two profilings 2b and 2c. Such an arrangement can be used for sealing as an elastic spring element with a high tensioning force which can exceed the tensioning force of one complete bead. In this case, a purely two-layer gasket can also be used, only the two gasket layers 1b and 1c of the four gasket layers in FIG. 6H forming the gasket together.

FIG. 7 shows here further examples of flat gaskets according to the invention. FIG. 7A thereby shows a flat gasket which has two metallic layers 1a, 1b. The layer 1b is provided with a bead 3 against which a profiled region 2 abuts directly adjacent to the port. The layer 1a adjacent to the layer 1b is not profiled, but grips around the layer 1b along the circumferential edge of the port and thus forms a stopper ring 9 on the opposite layer 1b. Hence the deformation limiting stopper effect is produced from the cooperation of the profiling 2 with the stopper 9.

In FIG. 7B, a corresponding two-layer flat gasket is illustrated as in FIG. 7A. The regions of the layer 1A directly adjacent to the profiled region, designated here with 2B, of the layer 1b, are provided in the same way with a profiling 2a or 2c so that the layer 1a abuts in a form fit against the profiled region 2B of the layer 1b on both sides.

FIG. 7C shows an arrangement as in FIG. 7A, however the layer 1a being provided not as a whole-surface metallic layer, but only as stopper ring 8 in the region of the profiling 2 of the metallic layer 1. Once again the stopper 8 grips around the layer 1 along the circumferential edge of the port and forms a second stopper 9. This concerns consequently a folded stopper.

A folded stopper ring 8, 9 is illustrated in FIG. 7D in a corresponding manner to FIG. 7C, however the regions 2A or 2C of the stopper 8, 9 directly adjacent to the profiling, designated here with 2B, of the layer 1 being profiled likewise in a similar manner to the layer 1 in the profiling region 2b and thus abutting on both sides against the profiling 2b in a form fit. This consequently concerns here also a profiled folded stopper.

In further examples, both the amplitude and the spacing of the individual wave crests can be varied not only within the profiling 2b, either along the circumferential edge of the port or also in a perpendicular direction to the circumferential edge of the port, but also the profiled regions 2A and 2C can in a similar manner have a profiling with different amplitudes and wave spacings. In particular wave crests between the individual layers at adjacent places can deviate from each other. Thus the profiling 2a and 2c in FIGS. 7B and 7D can have wave crest heights or wave crest spacings at points adjacent respectively to the profiling 2b which are different from the latter. By corresponding choice of amplitudes and periods of the profiling in the individual layers and stopper rings, a specific influencing of the deformation limitation and of the elastic properties of the flat gasket directly adjacent to the port is possible.

In FIG. 8, an embodiment is now shown in which the profiling 2 is formed in the shape of a trapeze. The trapeze comprises accordingly uniform trapezes which are disposed in a row. In the embodiment of FIG. 8a, an edge angle is provided which can be between 0 and 30 degrees. FIG. 8b shows a further embodiment in which the trapezoidal profiling 2 is adjacent to a bead 3. It is essential in the embodiments according to FIGS. 8b and 8c and 8d that the profiling 2 in its amplitude, i.e. in the profile height, and the spacing of the wave crests from each other (periods) differ clearly from the profiling of the bead 3. The profile height of the profiling is accordingly half or less than that of the bead 3.

The embodiment of FIGS. 8*b* and 8*d* are formed comparably with respect to the profiling 2 and the bead 3. The FIG. 8*c* shows a two-layer variant, each of the two layers having an identical profiling. In contrast, an embodiment is also possible in which only one of the two active layers—as here in 8*d* the lower layer—shows the profiling according to the invention.

Whichever of the corresponding embodiments are chosen depends upon the respective purpose of use, i.e. upon the conditions for which the gasket is provided.

A particular advantage of the embodiments according to the invention according to FIG. 8 can be seen in the fact that, by flattening the wave crests and wave troughs, i.e. by forming a trapeze for the profiling, better sealing conditions are achieved, which obviously can be attributed to the fact that this embodiment leads to significantly reduced recesses on the top and/or block side.

FIG. 9 shows a further embodiment of the profiling 2. Only the profiling is shown in the embodiment according to FIG. 9. This profiling 2 can be disposed once again, as also shown in FIGS. 8*a* to 8*d*, adjacent for example to a bead and be disposed in one, two or three layer concepts.

The advantage of the embodiment according to FIG. 9 can be seen in the fact that here a radius-swaged undulating bead is used, i.e. a profiling, in which the undulation has been swaged in the crests and troughs so that the result is material strengthening at the edges. This embodiment is distinguished by a particularly good behaviour with respect to recessing on the cylinder in a block and/or top side. The advantage of this variant can also be seen in the fact that the elastic behaviour can once again be set specifically by the degree of swaging. According to whether the material thickening in the edges is more or less reinforced with respect to the embodiment according to FIG. 8, this leads to a change in the elastic behaviour. In FIG. 9 a corresponding dimensioning is indicated in order to clarify the plastic deformation.

The embodiment according to FIG. 9 has proved to be particularly preferred.

What is claimed is:

1. A gasket comprising:
   a metallic layer having a bead formed therein, wherein said bead circumvents a port;
   at least one metallic layer having an upper surface and a lower surface, wherein said at least one metallic layer includes at least one region of undulating profiling around said port radially adjacent to said bead to form a deformation limiter for said bead, wherein said deformation limiter elastically maintains at least a portion of said undulating profiling when the gasket is installed, said region of undulating profiling including a crest, a trough and at least one transition between said crest and said trough and wherein said crest is a portion of one of said surfaces, said trough is a portion of the other of said surfaces, and said transition extends therebetween a shape of said bead being distinct from said undulating profiling; and
   wherein said at least one metallic layer further comprises a spring steel or a cold deformable steel that hardens during tempering, and wherein said deformation limiter is not folded over, a shape of said bead being distinct from said undulating profiling.

2. A gasket, as in claim 1, wherein said at least one metallic layer further includes a bead positioned adjacent said profiling and around said port.

3. A gasket, as in claim 1, further including a second metallic layer having at least one port and a second region of undulating profiling, wherein said second undulating profiling of said second metallic layer abuts said profiling of said at least one metallic layer.

4. A gasket, as in claim 3, wherein said undulating profilings include wave crests having spacings therebetween and said spacings of each of said undulating profilings are different.

5. A gasket, as in claim 3, wherein said undulating profilings include profile heights and said profile heights of each of said undulating profilings are different.

6. A gasket, as in claim 3, wherein said undulating profilings include radii of curvature and said radii of each of said undulating profilings are different.

7. A gasket, as in claim 3, wherein said second metallic layer further includes a bead positioned adjacent said second region of undulating profiling and around said port.

8. A gasket, as in claim 1, further including a metal ring disposed as a stopper in said region of undulating profiling.

9. A gasket, as in claim 8, wherein said metal ring is positioned partly around said port.

10. A gasket, as in claim 8, wherein said metal ring is crimped over said at least one metallic layer along said port to form an upper and lower stopper.

11. A gasket, as in claim 8, wherein said metal ring includes profiling.

12. A gasket, as in claim 1, wherein said undulating profiling includes wave crests and said wave crests are flattened.

13. A gasket, as in claim 1, wherein said undulating profiling is generally trapezoidal.

14. A gasket, as in claim 1, wherein said undulating profiling is plastically deformable.

15. A gasket, as in claim 1, wherein said undulating profiling is swaged to form a wave having a taper.

16. A gasket, as in claim 1, wherein said undulating profiling further includes troughs containing filler material.

17. A gasket, as in claim 16, wherein said filler material is an elastomer.

18. A gasket, as in claim 16, wherein said troughs contain varying quantities of said filler material.

19. A gasket, as in claim 1, wherein said undulating profiling includes a plurality of waves having spacings therebetween and wave troughs.

20. A gasket, as in claim 19, wherein said waves vary in quantity around said port.

21. A gasket, as in claim 19, wherein said spacings between waves vary around said port.

22. A gasket, as in claim 19, further including webs between said waves.

23. A gasket, as in claim 19, further including webs in said wave troughs.

24. A gasket, as in claim 19, wherein said waves and troughs are flattened.

25. A gasket, as in claim 19, wherein said waves and troughs on opposite sides of said metallic layer have varying characteristics such as height, spacing, shape or material thickness.

26. A gasket, as in claim 1, wherein said undulating profiling includes profile heights.

27. A gasket, as in claim 26, wherein said profile heights vary around said port.

28. A gasket comprising:
   a metallic layer having a bead formed therein, said bead circumventing a port;
   a first metallic layer, wherein said first metallic layer includes a first region of undulating profiling radially adjacent to said bead around said port to form a deformation limiter for said bead and further comprises a spring steel or a cold deformable steel that hardens during tempering;

a second metallic layer and a second region of undulating profiling, wherein said second region of undulating profiling of said second metallic layer abuts said undulating profiling of said first metallic layer; and wherein said deformation limiter elastically maintains at least a portion of said undulating profiling when the gasket is installed, a shape of said bead being distinct from said undulating profiling, said first region and said second region each include a crest, a trough, and at least one transition between said crest and said trough, said crest is a portion of a layer surface and said trough is a portion of an opposing layer surface and said transition extends therebetween.

29. A gasket, as in claim 28, wherein one of said first metallic layer and said second metallic layer includes said bead positioned adjacent said undulating profiling.

30. A gasket, as in claim 28, wherein said spacings between waves, said wave troughs and said profile heights of said undulating profiling and said second region of undulating profiling are different.

* * * * *